(No Model.)

J. FRASER.
EARTH AUGER.

No. 503,078. Patented Aug. 8, 1893.

Witnesses.
Arthur J. Sangster.
Jennie M. Caldwell.

John Fraser Inventor.
By James Sangster
Attorney.

UNITED STATES PATENT OFFICE.

JOHN FRASER, OF BUFFALO, NEW YORK, ASSIGNOR TO HIMSELF AND AUGUST C. SOMNER, OF SAME PLACE.

EARTH-AUGER.

SPECIFICATION forming part of Letters Patent No. 503,078, dated August 8, 1893.

Application filed April 20, 1893. Serial No. 471,143. (No model.)

*To all whom it may concern:*

Be it known that I, JOHN FRASER, a subject of the Queen of Great Britain, residing in Buffalo, in the county of Erie and State of New York, have invented certain new and useful Improvements in Earth-Augers, of which the following is a specification.

My invention relates to certain improvements in earth augers whereby the auger is rendered more simple and efficient in its action, all of which will be fully and clearly hereinafter described and claimed, reference being had to the accompanying drawings, in which—

Figure 1:
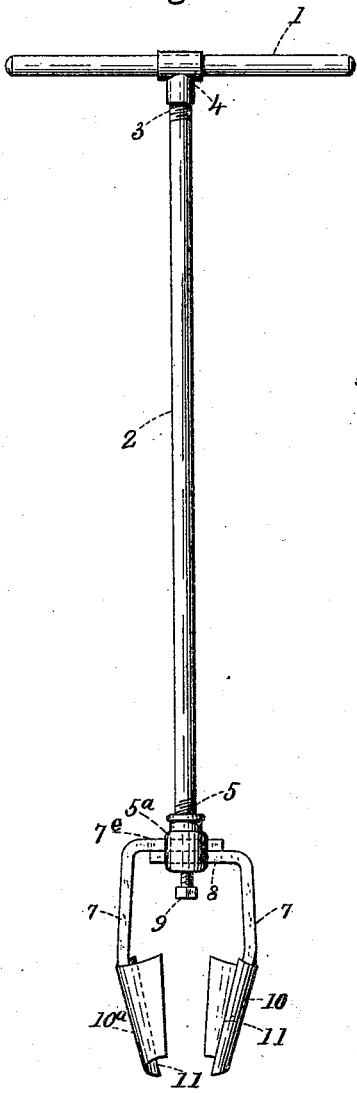
Figure 2:
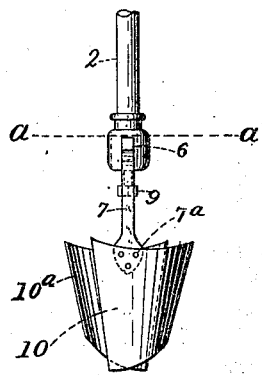
Figure 3:
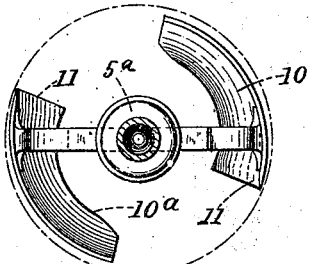
Figure 4:
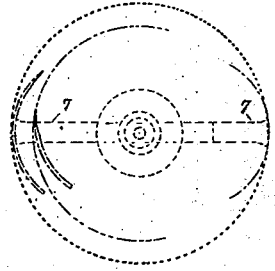

Figure 1 is a side elevation of the earth auger complete, showing an edge view of the auger cutting blades. Fig. 2, is a side elevation, showing an outside face view of one of the auger cutting blades, the upper portion of the handle being omitted. Fig. 3, is a top view of the device showing a horizontal section in or about line $a\ a$, Fig. 2. Fig. 4, is a diagrammatic view for illustrating the operation of the auger blades.

The handle 1, is made of the usual material, wood. The vertical bar is preferably made of iron gas pipe and is designated by the numeral 2. At the top is secured by the usual screw portion, 3, a T portion 4. Into the horizontal portion of the T is slipped and secured a wooden handle 1. At the bottom of the bar 2, is secured by a screw portion 5, a holding portion 5ª. A transverse rectangular opening 6, is cut through the portion 5ª, for holding the bar supporting the auger blades. These angular supporting bars each consist of a vertical portion 7, which is riveted at its lower end at or about the point 7ª, to the auger blades. The upper horizontal portions 7ᵉ, and 8, are each passed into the rectangular opening 6, one above the other, so that their ends pass each other and are both secured at once by tightening the set screw 9, (shown in Fig. 1.)

From the above construction it will be seen that when it is desired to either expand or contract the auger so as to bore a larger or smaller hole, all that is necessary to do is to loosen the set screw 9, and then adjust the portions 7ᵉ and 8, to the point desired and then tightening the set screw 9 again. The auger blades 10 and 10ª, are each made substantially alike and preferably of cast steel.

It will be noticed that the supporting arms 7, are attached to the blades at a point near the cutting edge of each, and the sharpened or cutting edge of each auger blade is made to incline outward a little beyond the line of a circle of which the central point is located centrally between the two auger blades. This arrangement brings the heel of each auger blade slightly within the line of said circle. The object of this construction is that, if the two auger blades were secured centrally to the bars 7, substantially as shown in the diagram Fig. 4, and then adjusted outward beyond the diameter of a circle of which the curved blades form a part, their cutting edges would not be in a position to cut, (see Fig. 4,) whereas if the auger blade be connected substantially as shown in Fig. 3, their cutting edges 11, would be in the same condition to cut, at any point to which they may be expanded to whether it be a large or small circle or for a large or small hole, so that the device will cut freely when adjusted to cut a hole of any diameter or of any intermediate diameter. It will also be noticed that the cutting edge projects down farther than the heel of the cutter or auger blade. This construction allows the cutters to clear themselves more readily when operated. There being no suction the auger can be easily withdrawn.

I claim as my invention—

An earth auger, consisting of a handle 1, and its vertical supporting bar, 2, a suitable holding portion attached to the bottom of the vertical supporting bar and having a transverse rectangular opening through it, in combination with two curved tapering auger cutting blades each having an arm which projects upward from a point near its cutting edge, and is then bent horizontally or nearly so, so that both are adapted to pass in opposite directions into and through the rectangular opening in the holding piece, and a set screw located centrally at the under side of the holding portion for tightening them rigidly in place when adjusted, substantially as described.

JOHN FRASER.

Witnesses:
ARTHUR J. SANGSTER,
JENNIE M. CALDWELL.